United States Patent [19]
Buchmeier

[11] 3,760,655
[45] Sept. 25, 1973

[54] TURRET FOR ASSEMBLY ON A MACHINE TOOL AS A MACHINING UNIT

[76] Inventor: Heinz Buchmeier, Halstenbeker Weg 46a, Hamburg, Germany

[22] Filed: Oct. 15, 1971

[21] Appl. No.: 189,651

[30] Foreign Application Priority Data
Dec. 17, 1970 Germany.................. P 20 62 133.4

[52] U.S. Cl.......................... 74/826, 29/49, 74/818, 82/36 A
[51] Int. Cl............................................. B23b 29/32
[58] Field of Search.............. 74/826, 813 L, 813 R; 29/49; 82/36 A

[56] References Cited
UNITED STATES PATENTS
| | | | |
|---|---|---|---|
| 2,547,616 | 4/1951 | Beekman | 74/826 X |
| 3,222,955 | 12/1965 | Ross et al. | 74/826 |
| 3,613,483 | 10/1971 | Cinadr | 74/826 |
| 3,628,400 | 12/1971 | Chope et al. | 74/826 |

Primary Examiner—Charles J. Myhre
Assistant Examiner—F. D. Shoemaker
Attorney—Beaman & Beaman

[57] ABSTRACT

A turret which can be remote-controlled and which is designed for attachment as a machining unit to a machine tool, in which the turret comprises a stationary part adapted to be detachably mounted on a machine tool and a movable part rotatably mounted on the stationary part by means of a one-way coupling, which can be engaged in one direction of rotation of the movable part to unlock and pivot said movable part and disengaged in the other direction of rotation to lock the movable part, and an interlocking coupling, capable of axial movement from a locked to an unlocked position and vice versa in response to axial movement of the movable part; a screw-threaded portion arranged to be driven by a motor being rotatably mounted on the stationary part and connected by a screw-threaded connection to a portion of the movable part, a further rigid coupling being provided for the screw-threaded connection and the motor being arranged to rotate the movable part through a number of stations and by a predetermined angle past a selected station in the said other direction whereby the rigid coupling is disengaged before the drive motor is reversed to rotate the movable part in said one direction to lock said interlocking coupling.

14 Claims, 15 Drawing Figures

PATENTED SEP 25 1973

INVENTOR
Heinz Buchmeier
BY
Beaman & Beaman
ATTORNEYS

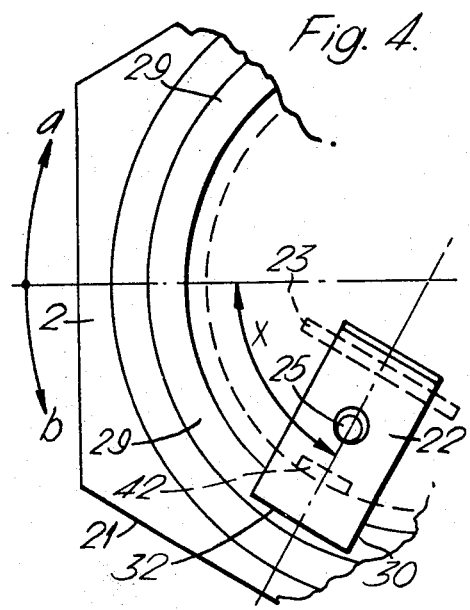
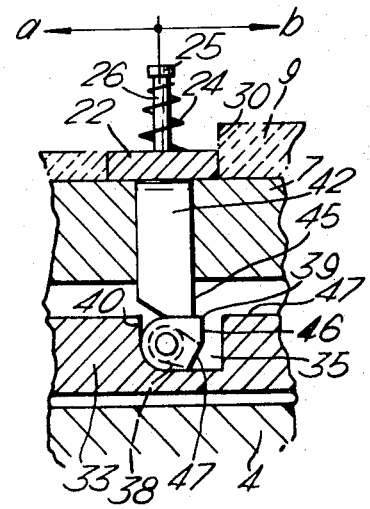
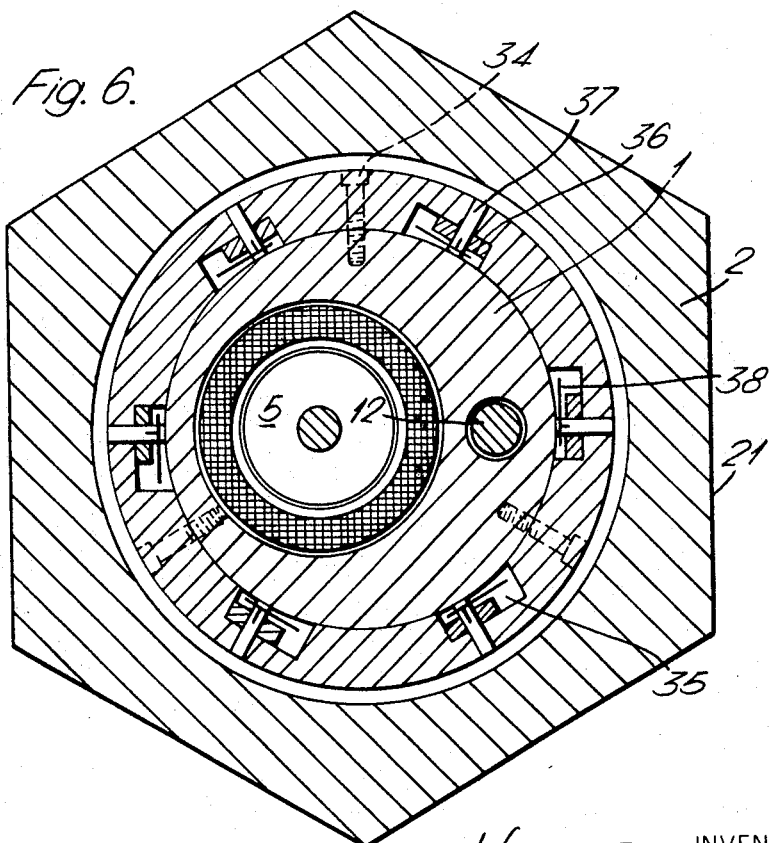

TURRET FOR ASSEMBLY ON A MACHINE TOOL AS A MACHINING UNIT

BACKGROUND OF THE INVENTION

The present invention relates to a turret which can be remote-controlled, is designed for attachment as a machining unit to a machine tool such as a lathe in particular, and which is equipped with a drive motor which not only releases and pivots the turret but also serves to lock it.

Generally speaking, it will be found best to design the motor as an electric motor. It is equally possible, however, to design it as a hydraulic motor or even as a compressed air motor, within the context of the invention.

Although, generally speaking, in the case of turrets which are assembled on a machine tool as an integral part thereof, one motor is provided to pivot the turret from one station to another, and an additional motor to lock and unlock the rotating part of the turret in the selected stations, the invention relates to a machining unit in which a single motor performs both kinds of function.

Here, the motor is mounted upon the stationary part of the machining unit, which is detachable secured to the machine tool, and is connected to the rotatable part of the turret on the one hand through a one-way coupling which can be engaged in one direction of rotation, in order to unlock and pivot the rotatable turret section, and disengaged in the other direction of rotation in order to lock said rotatable turret section, and on the other hand via a coupling disposed centrally in relation to its axis of rotation and engageable and disengageable by an axial motion, in particular a flat-notch toothed coupling.

The rotatable turret section is in this case assembled upon the stationary section in such a fashion that it can move axially at least over the distance of disengagement and engagement of said interlocking coupling, and is connected with said section through a thread disposed centrally vis-a-vis the turret axis, which thread, with rotation of the rotatable turret section in relation to the stationary section in the direction corresponding to engagement of the one-way coupling, is displaced in one axial direction in order to lock the interlocking coupling, while with rotation in the opposite direction, is displaceable in the opposite axial direction in order to release the coupling. The threaded connection can also be designed with flat or face gear teeth. This kind of gear tooth, however, is only able to positively couple the interlocking coupling (the latter design in particular with Hirth gearing), and not to uncouple it so that when using gearing of this kind special springs have to be provided in order to uncouple the interlocking coupling. For the purposes of the invention, therefore, a threaded connection is given the preference, this operating axially in both directions and accordingly both uncoupling and coupling the interlocking coupling in the form of a fully constrained pair.

With turrets of this kind designed as a machining unit, the unlocking of the interlocking coupling and the ensuing pivoting or indexing of the rotating part of the turret into the new section, is carried out with the drive motor rotating in one direction, while the locking of the interlocking coupling, when the selector station has been reached, is effected by reversing the direction of rotation of the drive motor, i.e. by reversing the polarity in the case of an electric drive motor.

In the known types of this kind, designed as a machining unit, reliable indexing cannot be guaranteed in all cases. If the masses associated with the rotating part of the turret are particularly large and/or if particularly high rates of indexing are involved, then there is the risk that the interlocking coupling will not lock at the selected station but instead one or two teeth away from it.

SUMMARY OF THE INVENTION

The object of the invention is to increase the reliability of indexing of turrets of this kind. In this context, it is the object of the invention to provide turrets of this kind which will index completely reliably at particularly high indexing speeds and whilst carrying large masses.

In accordance with the invention, this object is achieved in that the two sections of the threaded connection, which are axially and rotatably displaceable in relation to one another, can be coupled with one another through a rigid coupling during rotation, in order to unlock the interlocking coupling and pivot the rotating section of the turret; and in that the rigidly coupled unit constituted by threaded connection and rotatable turret section, on reaching the station selected by remote-control, can be moved further through a predetermined angle before the motor is reversed in order to lock the interlocking coupling, which angle is such as to enable said rigid coupling to be disengaged.

In order to couple the two parts of the threaded connection, reference is made here to a rigid coupling while the coupling by means of which the rotatable turret section can be positively locked in its stations and on the stationary section, is referred to as an interlocking coupling. Fundamentally, both types of coupling can be referred to either as interlocking or rigid couplings, the separate expressions only having been employed here in order to distinguish between the designations of the two couplings.

Preferably, the rigid coupling provided between the two parts of the threaded connection, will be designed as a latch which is movably assembled on the motor-driven part of the threaded connection and, with the coupling engaged, itself engages in a latching recess in the other part of the threaded connection which is fixed to the rotatable turret section.

When locking and unlocking the interlocking coupling (in particular the Hirth gearing), therefore, the two sections of the threaded connection are rotatable in relation to one another so that with such relative rotation an axial motion is available in order to lock and unlock the interlocking coupling. After completion of the locking of this interlocking coupling, however, the two parts of the threaded connection are rigidly connected with one another so that even where the applied torque is high, reliable indexing is ensured. In order to release this rigid coupling and in particular to lift the latch out of its corresponding latching recess, a certain indexing travel is required and in accordance with the invention this is achieved in that the rotatable section of the turret is traversed a predetermined angle beyond the particular selected station.

In implementation of the invention, the latch and the moving part of the rigid coupling can, through the medium of a plurality of one-way couplings, be controlled from the stationary section of the turret, the number of such one-way couplings corresponding with the number of indexing positions of the rotatable turret section.

These one-way couplings and, in association with them, the means for engaging and disengaging the rigid couplings, can be designed in a variety of ways. In a particularly advantageous embodiment of the invention, a drag ring is rotatably mounted on the stationary section of the turret; between a lifter which is arranged between said drag ring and the latch, and a ratchet recess in the ring, there is a one-way coupling which, when the rotatable turret section pivots, engages at a new station but with the opposite direction of pivot, is uncoupled, the lifter being lifted out of its ratchet recess. Also, between the ring and the stationary section of the turret there is a plurality of one-way couplings whose number corresponds with the number of indexing stations of the turret and which, with rotation of the rotatable turret section in order to index to a new station couples, while with rotation in the opposite direction it uncouples. Accordingly, the drag ring, in relation to the drive nut of the threaded connection, executes a motion which is equivalent simply to the angle required to lock and unlock the interlocking coupling, plus the surplus travel which, in accordance with the invention, is required to uncouple the rigid coupling provided between the parts of the threaded connection. In order to provide this surplus travel, by way of example, an additional rotation of the rotatable turret section beyond the particular selected station by 8° to 10°, can be arranged for.

Separate axial mounting of the drag ring is not necessary because with the axial lifting of the rotatable turret section out of the interlocking coupling, the ring is always moved into its correct axial position.

In this drag ring, preferably, in accordance with the invention, between the lifter and one ratchet notch provided in the drag ring, two pairs of surfaces will be provided one of which entrains the drag ring when the rotatable turret section pivots to a new station, and the other of which, when the rotating turret section pivots in the opposite direction, lifts the lifter and the latch out of the latching recess, against the force of a latch spring.

Preferably, the motor will be installed in a hollow column of the turret. As already mentioned above, the motor may be an electric one or for that matter a hydraulic or compressed air motor.

In a particularly advantageous embodiment of the invention, the motor is assembled eccentrically in the stationary section of the turret and its output shaft, acting from below, drives the driving section of the threaded connection through step-down gearing, said driving section being rotatably mounted and secured against axial displacement, on the hollow column of the stationary section of the turret.

It is advisable here, to install the motor with a shaft extending parallel to the axis of rotation of the turret, in the hollow column of the stationary section of the latter and to arrange for it to drive the driving section of the threaded connection through a parallel stepdown gearing set. The reduction ratio which can be achieved with this kind of parallel gearing, is relatively small in comparison with an epicyclic gearing arrangement so that consequently the rotatable part of the turret has high indexing speeds, however, the latter are of no importance where the invention is concerned because reliable indexing is ensured even at high indexing speeds and where large masses are involved.

Other arrangements of the driving electric motor, however, are likewise advantageously possible within the scope of the invention. For example, the installation of the motor in the connecting flange of the turret or on the external face located opposite this connecting flange, is possible.

BRIEF DESCRIPTION OF THE DRAWINGS

The invention will now be further described, by way of example, with reference to the accompanying drawings, in which:

FIG. 4 is a plan view similar to that of FIG. 2, i.e., likewise in the direction of the arrow II in FIG. 1, this time however after the completion of the unlocking motion of the latch;

FIG. 5 is an illustration similar to that of FIG. 3, i.e., a fragmentary section on the line III—III of FIG. 1, this time however illustrating the phase of rotation of the rotatable turret section into a new station;

FIG. 6 illustrates a section on the line VI—VI of FIG. 1;

In the drawings, like or corresponding parts are denoted by the same reference numerals.

DESCRIPTION OF PREFERRED EMBODIMENTS

Figure 1:
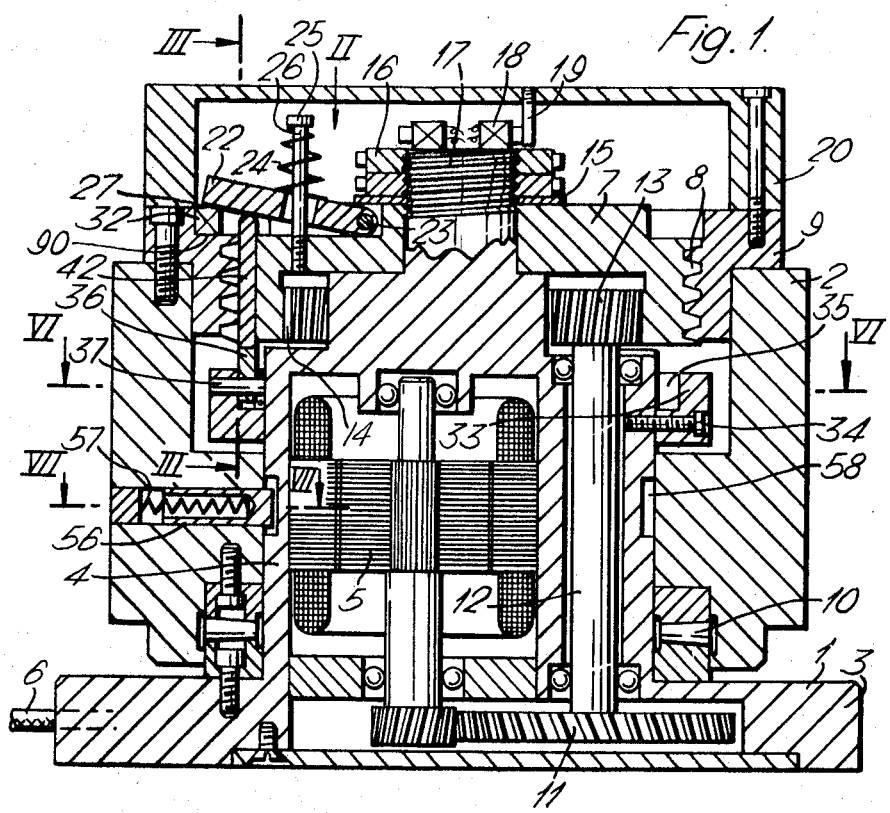
FIG. 1 illustrates a section through one embodiment of a turret in accordance with the invention, taken on the line I—I of FIG. 2.

Reference will first be made to FIGS. 1 to 7 of the drawings in which the turret, designed as a machining unit, consists of a stationary section generally marked 1 and a rotatable section generally marked 2. The stationary section 1 is detachably fixed by a flange 3 to a machine tool, in particular a lathe, and has a hollow column 4 in which an electric motor 5 is rotatably installed. The motor 5 serves as a drive motor and is connected to a voltage source through a cable 6, by a plug-in connector (not shown).

Rotatably mounted on the stationary section 1 in such a fashion as to have no axial displacement, is the male thread section 7 of a threaded connection 8 whose female thread section or nut 9 is fixed to the rotatable section 2 of the turret. On mutually facing surfaces of the stationary section 1 and the rotatable section 2, the two parts of an interlocking coupling, in particular a flat-notched tooth formation (Hirth tooth) 10, are attached. By axial movement of the rotatable section 2 in relation to the stationary section 1, this interlocking coupling can be engaged and disengaged, the toothing of the coupling at the same time ensuring axial disengagement between the two components. Instead of the Hirth teeth, Gleason teeth can for example be used, which has curved teeth.

If the rotatable section 2 of the coupling is moved axially upwards in FIG. 1, the interlocking coupling 10 is disengaged or unlocked while with the opposite axial displacement when section 2 is moved downward the coupling 10 is engaged or locked.

Through a parallel reduction gear 11, the motor 5 drives the shaft 12 of a pinion 13 which meshes with internal gear teeth 14 on the male threaded section 7. Pinion 13 and internal teeth 14 are of the helical kind, forcing the male threaded ring 7 into contact with a bearing plate 15 which, by means of two nuts 16 is screwed to a screw-threaded end 17 of the stationary section 1 of the turret and to the hollow column 4. Limit switches 18 are provided to give a positional indication of the individual indexing stations of the rotatable turret section. The switches 18 are actuated by a tripping pin 19 which rotates with the turret and, in the example illustrated, is attached to a cover 20 fixed to the nut 9. As the surfaces 21 shown in FIGS. 2, 4, 6 and 7 indicate, in the present example six stations are provided.

The male threaded ring 7 is thus rotatably mounted on the stationary turret section 1 but cannot move axially in relation thereto. When the electric motor 5 drives the male threaded ring 7 in one direction, the interlocking coupling 10 (fully constrained pair) between the stationary and rotatable turret sections is unlocked, while with the opposite direction of rotation it is locked.

In FIGS. 2, 3, 4, 5, 9 and 10, the letters *a* and *b* are applied to two arrows which point away from one another. The arrow *a* describes a direction of rotation followed by the rotatable turret section when the interlocking coupling is being locked and when unlocking a rigid coupling which, in a manner which has yet to be described, is arranged between the male threaded ring 7 and the nut 9. The arrow *b* describes the direction of rotation followed by the rotatable turret section in order to unlock the interlocking coupling 10.

Figure 1A:
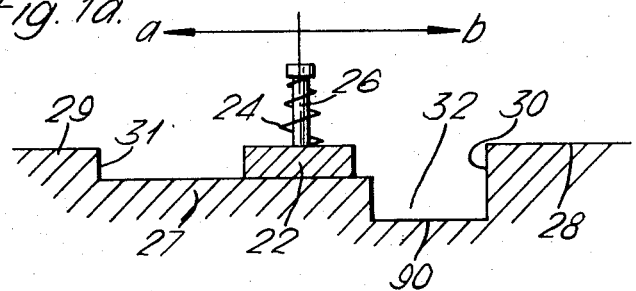
FIG. 1a illustrates a part-elevation of the top internal circumference of a nut ring used in the embodiment shown in FIG. 1.

In order to rigidly couple the threaded ring 7 and nut 9 with one another, a latch 22 is provided which is pivotally assembled on the male threaded ring 7 by means of a pin 23. By means of a spring 24 which seats at one end on the latch 22 and at the other end on the head 25 of a retainer 26 fixed to the male threaded ring 7, the external surface of the latch 22 is forced into contact with a control ring 27 designed as part of the nut 9. As FIGS. 1a and 2a show, the control ring 27 consists of a control segment surface 28 and a control segment surface 29. The control segment surface 29 determines the latching angle X shown in FIGS. 2 and 4, which is the angle through which the male threaded ring 7 must be rotated about its axis in order to lock or unlock the interlocking coupling 10. Throughout the major part of this motion, the external part of the latch 22, as indicated in FIG. 1a, slides over the control surface 29. To either side, the control surface is limited by respective stops 30 and 31. The two stops 30 and 31 are formed by the ends of the segmental surface 29 which, accordingly, is of a lesser height from the basic surface 90 of the male threaded ring 7, than the control segment surface 28. Directly before the stop 30, the control segment surface 29 merges into a latching recess 32. The peripheral width of this latching recess 32 is, apart from a small clearance, equal to the peripheral width of the latch 22.

Figure 3:
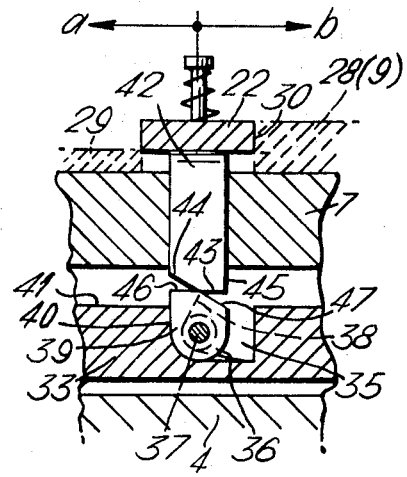
FIG. 3 is a fragmentary section on the line III—III of FIG. 1; the latch of the rigid coupling, inclusive of the associated spring-loaded ratchet, are here shown in the position which they occupy when the rotatable turret section is moving in the direction which produces locking of the interlocking coupling and unlocking of the rigid coupling.

On the external periphery of the hollow column 4 of the stationary turret section 1, a control ring 33 is attached by means of screws 34. As shown in FIGS. 3 and 5, this control ring contains recesses 35 in which pawls or ratchets 36 are assembled in each case by means of a pin 37. The axes of rotation of these ratchets or the like, are thus substantially radially disposed with respect to the axis of rotation of the rotatable turret section 2. In each case a torsion spring 38 urges the associated ratchet into the upward position shown in FIG. 3 in which the surface 39 of the ratchet engages with a corresponding surface 40 of the recess 35 in the ring. The number of pawls 36 distributed around the circumference corresponds with the number of stations which the rotatable turret section is to be able to occupy. In the example, and as shown in FIG. 6, six such ratchets 36 are provided.

The connection between the bottom surface of the latch 22 and the top surface 41 of the control ring 33 and the individual ratchets 36, is effected by means of a lifter 42 which is mounted in the male threaded ring 7 in such a fashion as to be displaceable parallel to the axis of rotation of the turret. The bottom surface 43 of the lifter merges at the side facing towards the arrow *a*, into an inclined surface 44. At the side facing the arrow *b*, the surface 43 merges into a vertical surface 45 which is disposed parallel with the axis of rotation of the rotatable turret section.

The terminal surface 46 of the ratchet 36, by contrast, has a vertical surface 39 which, in the inoperative position shown in FIG. 3, extends parallel to the turret axis at the side adjacent the arrow *a*. At the side adjacent the arrow *b*, the terminal surface 46 of the ratchet 36 merges into an inclined face 47.

Figure 7:
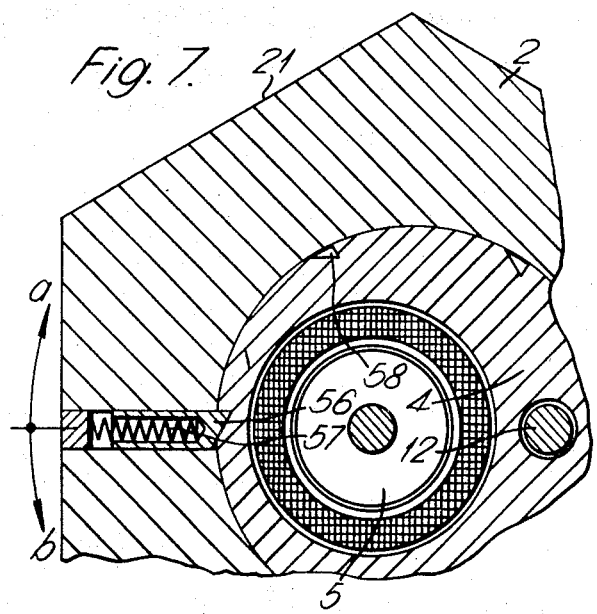
FIG. 7 is a fragmentary section on the line VII—VII of FIG. 1.

As shown in FIGS. 1 and 7, between the rotatable turret section 2 and the external periphery of the hollow column 4 of the fixed turret section 1, a plurality of one-way couplings is provided, which, in the example, are designed as detent pins 56 which can be radially displaced against the load of a spring 57 in each case, and are arranged in the rotatable section of the turret. The detent pins engage in corresponding detent recesses 58 of one-way design, provided at the external periphery of the hollow column 4. The number of these one-way couplings corresponds with the number of indexing stations of the turret. These one-way couplings are so designed that with rotation of the rotatable turret section 2 in relation to the fixed section 1, in the direction of the arrow *b*, the couplings are inoperative so that the rotatable turret section can thus rotate freely.

However, if the electric motor 5 drives the male threaded ring 7 in the opposite direction (arrow a), because of the presence of the one-way couplings 56, 57, 58 the nut 9 and therefore the rotatable part of the turret does not follow this rotational movement. With rotation of the male threaded ring 7 in this direction, the nut 9 undergoes an axial movement which produces locking engagement between the teeth of the interlocking coupling 10.

Accordingly, the interlocking coupling 10 is locked by this axial movement.

At this juncture, the mode of operation of the turret illustrated in FIGS. 1 to 7 will be described. In accordance with FIGS. 1 and 2, the rotatable section of the turret is held at the particular desired station during the pivoting operation, with the help of the spring loaded detent pins 56, 57, 58. In this position, the latch 22 will have engaged in the latching recess 32 under the influence of its spring 24. Thus, as shown in FIG. 5, a rigid coupling will have been produced between the latch 22 of the male threaded ring 7, and the nut 9. With further rotation in the direction of the arrow b, the lifter 42 is also made to rotate as shown in FIG. 5. As soon as its edge 45 hits the edge 39 of any of the ratchets 36, this particular ratchet is forced downwards against the action of its spring 38 so that the lifter 42 can ride over the ratchet and slide along the top surface 42 of the control ring 33 up to the next ratchet, and so on.

With the selection of a specific station of the rotatable section 2 of the turret, in accordance with the invention this section indexes a certain distance beyond the selected station, in the direction of the arrow b. As already explained hereinbefore, this overrunning corresponds for example to an angle between 8° – 10° although the invention is in no way restricted to these particular figures. The lifter 42 is then to the right of the position shown in FIG. 3. The ratchet 36, which is assembled in the recess 35 in the stationary control ring 33, will have already lifted again under the influence of its spring 38 and thus be in the position shown in FIG. 3.

If the polarity of the supply to the electric motor 5 is now reversed and its direction of rotation thus likewise reversed, then the male threaded ring 7 will rotate in the direction of the arrow a. The spring loaded ratchet 36, over which the lifter has just passed, is now unable to deflect however so that through the co-operation between the inclined surfaces 44 and 47 the lifter 42 is raised and thus, as shown in FIG. 3, the latch 22 also raised until its bottom surface is located higher than the surface 29. This consequently released the rigid coupling between the male threaded ring 7 and the nut 9 so that with further rotation of the ring 7 through the angle X (see FIGS. 2 and 4) the teeth of the interlocking coupling 10 between the stationary section 1 and rotatable section 2, are moved into firm engagement because the rotatable section cannot follow this rotational movement anyway thanks to the presence of the spring loaded detent pins 56, 57, 58. At the end of this rotation by the amount X in the direction of the arrow a, which is used to lock the interlocking coupling 10, the latch 22 comes up against the stop 31 (see FIG. 2).

In order to unlock the system, the electric motor 5 is again operated in such a way that the male threaded ring 7 moves in the direction of the arrow b, in fact through the angle X. At the end of this rotational movement, the latch 22 drops back into the latching recess 32 whereupon further rotation of the motor in the same direction causes the rotatable section 2 of the turret to pivot into the desired new station.

The embodiments shown in FIGS. 8 to 13 of the drawings will now be described in detail. The chief difference between these embodiments and the embodiment shown in FIGS. 1 to 7 resides in the provision of a drag ring 48 instead of the control ring 33.

Figure 9:
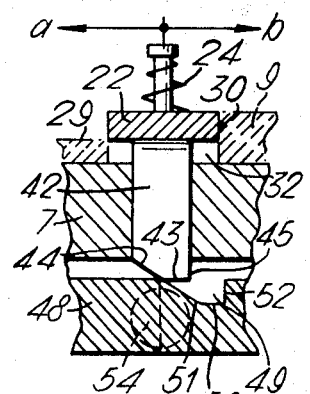
FIG. 9 is a partial section on the line IX—IX of FIG. 8 during the locking of the interlocking coupling and the unlocking of the rigid coupling.
Figure 8:
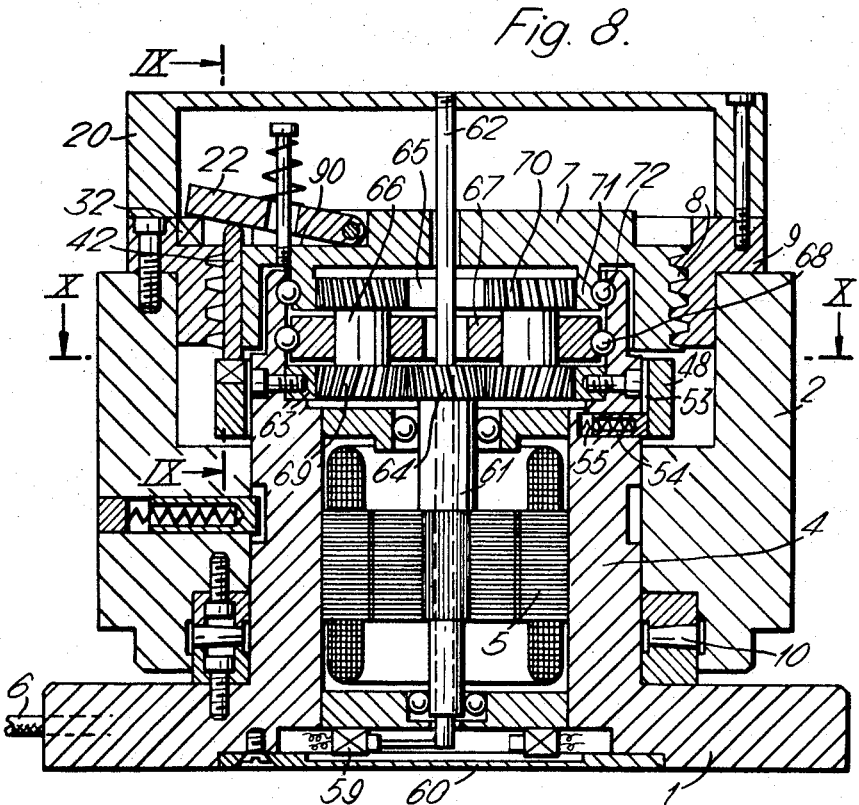
FIG. 8 is a section similar to that of FIG. 1 of a second embodiment of a turret according to the invention.
Figure 10:
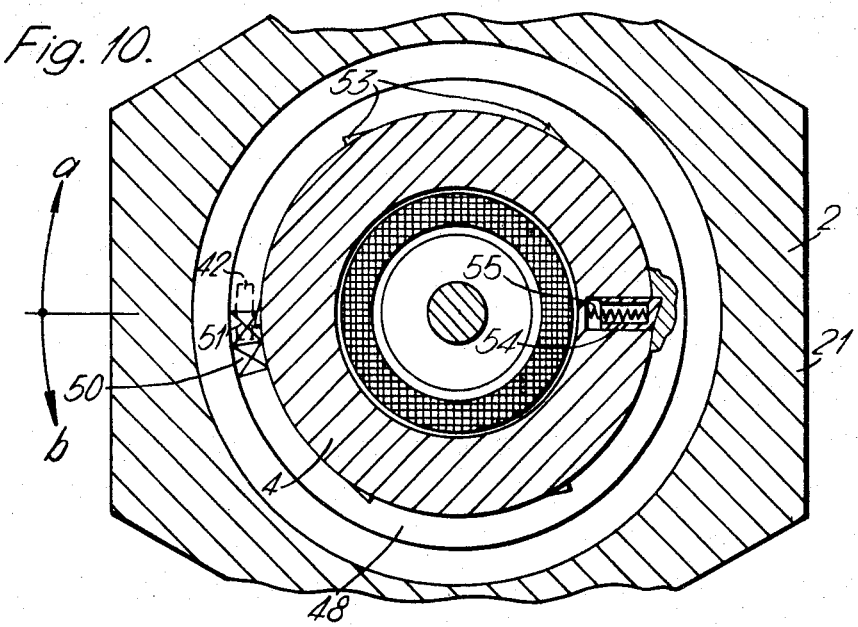
FIG. 10 is a section on the line X—X of FIG. 8.
Figure 11:
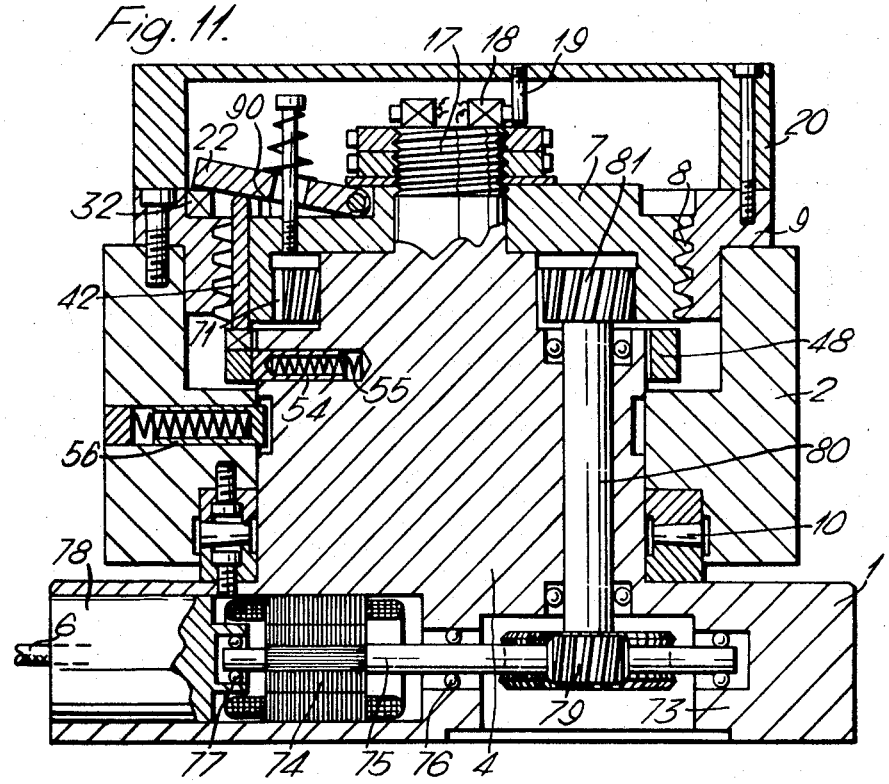
FIG. 11 is a section similar to those of FIGS. 1 and 8, through a further embodiment of the invention.

The drag ring 48 is mounted so that it is freely rotatable on the stationary section 1 of the turret, in fact, as shown in FIGS. 8 to 10 about the hollow column 4. At its top side, the drag ring has a detent recess or notch 49 the base surface 50 of which merges in the direction of the arrow a, into an inclined space 51, and, in the direction of the arrow b, into a vertical face 52 parallel to the axis of rotation of the turret. The two faces 51 and 52, as far as their action is concerned, correspond with the faces 39 and 45 of the individual ratchets 36 in the embodiment shown in FIGS. 1 to 7. The drag ring 48, however, has only one detent recess 49. Also, one-way detents 53 are provided on the internal periphery of the drag ring, their number corresponding with the desired number of indexing stations which the rotatable section of the turret is to occupy. Co-operating with these one-way detents 53 there is at least one spring-loaded ratchet pin 54, which is assembled in the stationary section of the turret and is under the control of a spring 55. The direction of displacement of the spring-loaded pin 54 is essentially radial with respect to the axis of rotation of the turret. By means of these ratchet detents 53, 54, 55, the drag ring 48 is prevented from rotating in relation to the hollow column 4 of the stationary section 1 of the turret, in the direction of the arrow a, while it can rotate in the direction of the arrow b in relation to the column 4 of the stationary section.

Figure 2:
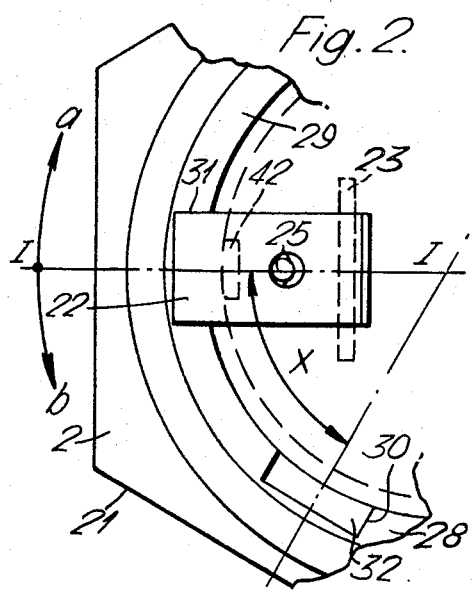
FIG. 2 illustrates a plan view in the direction of the arrow II in FIG. 1, omitting the cover.
Figure 2A:
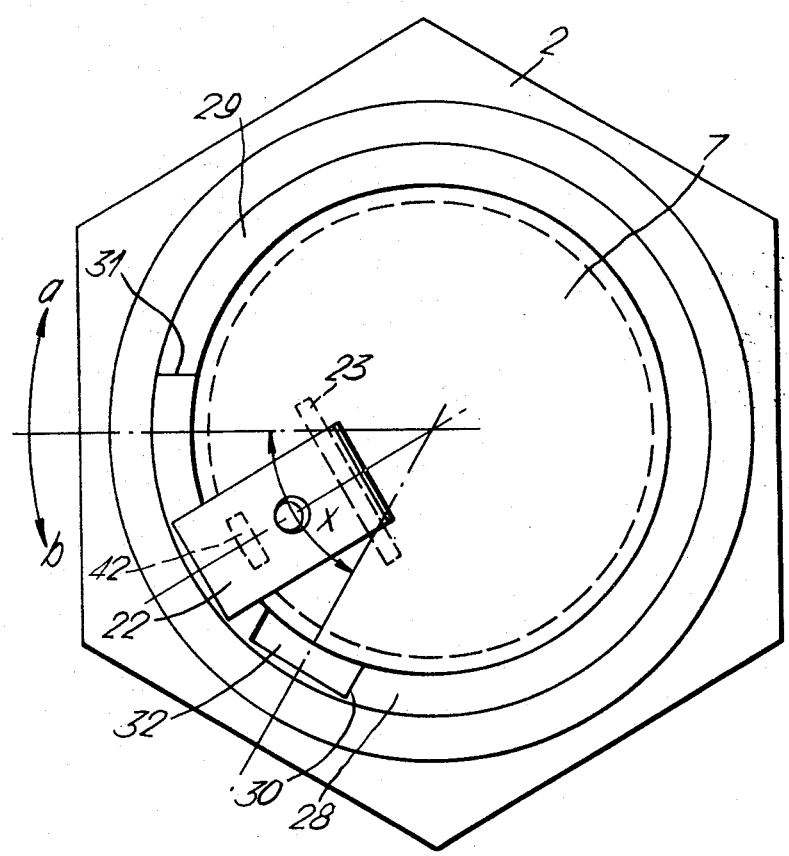
FIG. 2a is a fragmentary view taken in the direction of the arrow II, showing the components in a different relationship to one another.

The latch 22 and the latching recess 32, inclusive of the associated ground surface 29 and the stops 30 and 31, are designed in the same manner as in the embodiment shown in FIGS. 1 to 7. In FIG. 8, the latch is shown in the positions of FIGS. 1 and 2. Thus, it has been rotated out of the particular set position by the amount X in the direction of the arrow a, into the position in which it is up against the stop 31. The teeth of the interlocking coupling 10, thus, for example, the Hirth gearing, are in full engagement with one another in the axial direction.

In order to move the rotatable section 2 of the turret to a new station, the motor rotates the male threaded ring 7 in the direction of the arrow b. The latch 22 in so doing slides over the surface 29 while the end face 43 of the lifter 42 moves over the top surface of the drag ring 48. The latter is maintained in a specific radial position by the detent ratchet arrangement 53, 54, 55.

In FIG. 9, the latch 22 and the lifter 42 are shown precisely at the position of a detent latch location 53, 54, 55. The detent pin 54 has been drawn in. The single detent recess 49 in the drag ring 48 has been displaced in the direction of the arrow b by a certain interval out of the position determined by the ratchet stop 53, 54, 55, this interval corresponding to an overrun angle of, for example, 8° – 10°. The latch 22 was previously in the latching recess 32 so that the male threaded ring 7 and the nut 9 could be pivoted in the rigidly coupled condition, in the direction of the arrow b in order to reach a new indexing station. In so doing, the lifter 42 had entrained the drag ring 48 by applying its surface 45 against the surface 52 in the ring recess 49. The drag ring 48 will accordingly have followed the pivoting motion executed by the unit in the direction b, the unit in this case consisting of the male threaded ring 7, the nut 9 and the rotatable section 2 of the turret. In the described new station, the latch 22 and the male threaded ring 7 will have passed sufficiently far beyond the index position of the pin 54 in the direction of the arrow b, for the lifter 42 to have engaged with its tip surfaces 43, 44, 45 in the detent recess 49 in the drag ring 48.

If, now, the direction of rotation of the drive motor changes and the rotatable section of the turret thus begins to move in the direction a, then in the course of the interval corresponding to the overrun angle, the latch 22 is lifted out of its latching recess 32 because, while the drag ring 48 now remains stationary, the male threaded ring 7 moves in the direction a so that the lifting surface 44 of the lifter 42 and the lifting surface 51 on the recess 49, slide over one another. The end of this lifting motion is shown in FIG. 9. The male threaded ring 7, with the latch 22, is now advanced further in the direction of the arrow through the angle X in order in the manner described in relation to FIGS. 1 to 7, to lock the interlocking coupling 10.

In order to select a new station, the latch 22 is first of all rotated in the direction of the arrow b through the angle X, together with the male threaded ring 7. At the end of this motion, the position shown in FIG. 9 will have been reached. The latch 22 now, under the influence of its spring 24, drops into the latching recess 32. The two threaded rings 7 and 9 are once again rigidly locked with one another. As soon as the overrun interval corresponding to an angle of about 8° − 10° has been traversed, the lifter 42 picks up the drag ring 48, the face 45 of the lifter coming up against the face 52 in he recess 49.

The drag ring is now entrained until the next required new station is reached.

Thus, compared with the drive nut, the drag ring 48 executes a relative motion equal to the angle X plus the interval of about 8° − 10° required to raise the lifter 42. The drag ring requires no special axial location because it is always forced into its correct vertical position by the lifting, rotatable section of the turret.

In the embodiment of FIGS. 8 to 10, the drive to the threaded connection 7, 8 is also modified. The electric motor 5 here has its axis of rotation disposed centrally in the hollow column 4 of the stationary section 1 of the turret. The station switches 59 are located in the bottom part of their hollow column, the latter here being closed off by a bottom cover 60. The limit switches 59 are operated by an actuator rod 62 which rotates with the rotatable section 2 of the turret and passes through the hollow shaft 61 of the electric motor 5.

The motor 5, centrally installed in the hollow column 4, drives the male threaded ring 7 through an epicyclic gear generally marked 63. The epicyclic gear includes a sun wheel 64 of toothed design, assembled centrally on the motor shaft. This drives a plurality of planet wheels which are generally marked 65 and whose individual shafts 66 are rotatably mounted in a planet wheel carrier or arm 67 which rotates about the central axis of the hollow column 4. The carrier is rotatably supported in ball bearings 68, in a corresponding locating bore in the hollow column, but is secured against axial displacement.

The planet wheels have bottom planet gears 69 which mesh with the central sun wheel 64 and are driven by the latter and upper planet gears 70 which, together with the lower planet gears 69, are secured on the same shaft. The planet gears 69–70 thus rotate on the one hand about their own axes and on the other hand commonly around the central axis of the hollow column 4, which axis, in the case of the example, corresponds with the axis of rotation of the electric motor 5.

The upper planet gears 70 drive a toothed ring 71 which is arranged on the male threaded ring 7 and is centrally disposed with respect to the axis of the hollow column 4. The male threaded ring 7 is mounted, for example, through ball bearings 72, so that it can rotate on the hollow column 4 but is axially secured in relation thereto. This ring 7 co-operates with the nut 9 in a manner which has been described in relation to the embodiment shown in FIGS. 1 to 7. At the top, the threaded connection 7, 8, including the spring-loaded latch 22, is closed off by a cover 20.

In the embodiment shown in FIG. 11, once again a drag ring 48 is used, in the same way as in the embodiment shown in FIGS. 8 to 10. However, in the case of the embodiment shown in FIG. 11 the flange 73 of the stationary section 1 of the turret is relatively high. In the neighbourhood of this flange, a high speed electric motor 74 is arranged whose axis is disposed perpendicularly to the axis of rotation of the rotating section 2 of the turret and does not intersect same. The shaft 75 of the motor is supported on the one hand in the stationary section of the turret, in a bearing 6, and on the other hand in a bearing 77 in an end cover 78 which closes off from the exterior cavity containing the motor 74.

The electric motor 74, through the medium of a worm gear 79 which produces a high reduction ratio drives a shaft 80 which is disposed parallel to the axis of rotation of the rotating section of the turret, but eccentrically in relation thereto. The shaft 80 serves to drive a pinion 81 which meshes with internal toothing 71 provided on the male threaded ring 7. The threaded connections 7, 8, the rigid coupling between the two components provided by the latch 22, and the lifter 42 are designed in accordance with the embodiment shown in FIGS. 8 to 10.

In the previous embodiments, the shaft driven by the motor enters the hollow column of the fixed section of the turret from below, this being an advantage in so far as in this manner the entire top region of the turret is occupied by its rotating section. A particular advantage here, of course, is the arrangement of the electric motor in the hollow column 4 of the stationary section 1 of the turret, but in the embodiment shown in FIG. 11, the flange of the stationary section of the turret need be raised only a relatively small distance.

Figure 12:
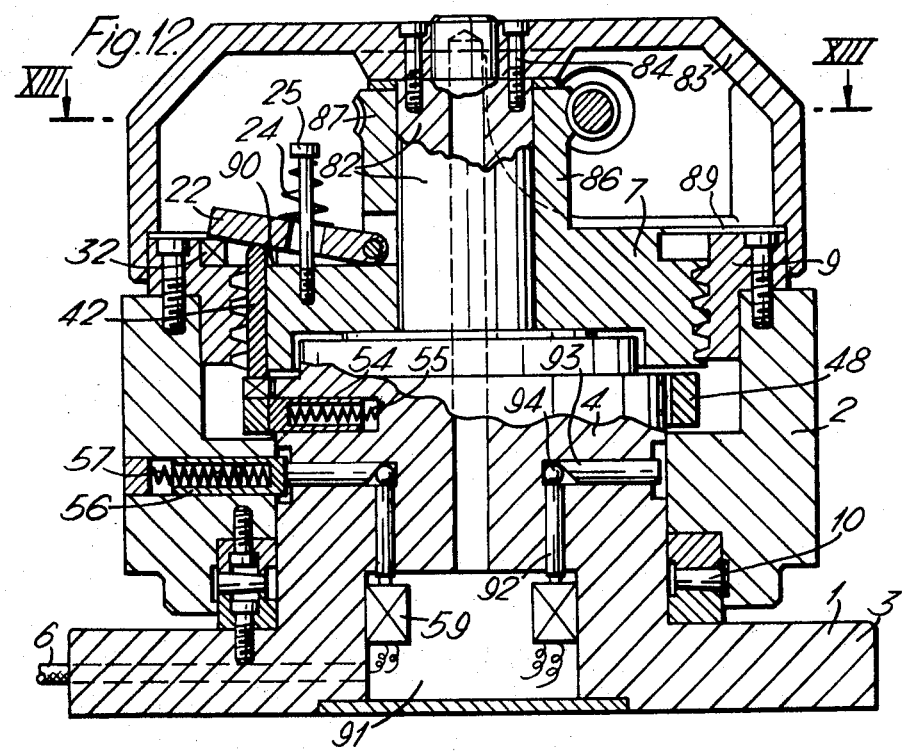
FIG. 12 is a section similar to the sections of FIGS. 1, 8 and 11 through yet another embodiment of the invention.
Figure 13:
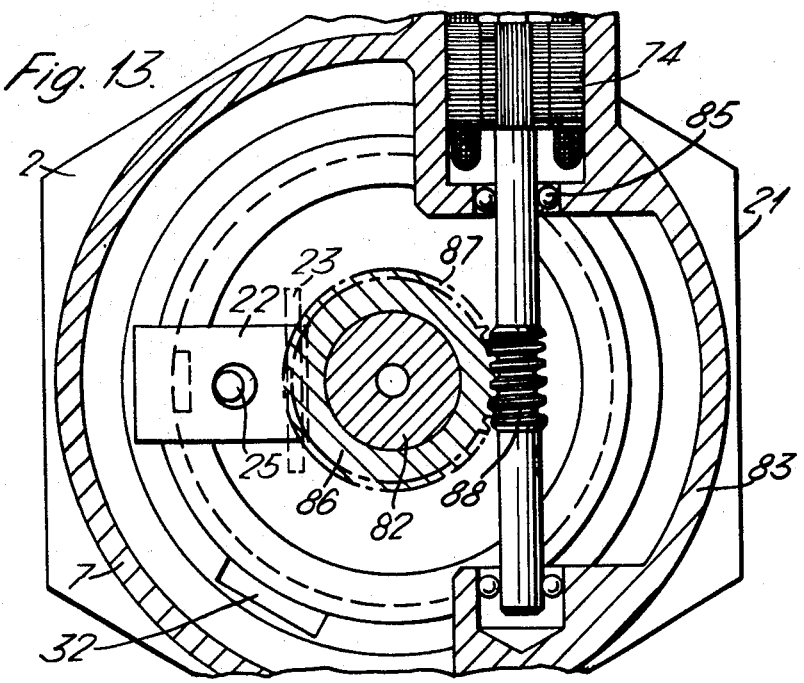
FIG. 13 is a section on the line XIII—XIII of FIG. 12, omitting the top housing.

In the embodiment shown in FIGS. 12 and 13, the driving electric motor 74 is installed at that end of the turret which is remote from the flange 3 of the stationary section. To this end, the column 4 of the stationary section is equipped with a central pin 82 to which an end cover 83 is attached by means of screws 84. The electric motor 74 is assembled in bearings 85 within the end cover 83. The outer bearing is not shown and corresponds with the bearing 77 in the embodiment shown in FIG. 11. This outer bearing 77, here again, is arranged in a closure plug which is likewise not shown. The electric motor 74 again drives the male threaded ring 7 through a worm gear 88. To this end, the male threaded ring 7 is provided with a hollow extension shaft 86 upon which the worm wheel 87 of the worm gear 88 is arranged. As shown at 89, once again facility for axial movement is provided between the rotatable and stationary sections of the turret, in order to enable the interlocking coupling 10 to engage and disengage, this coupling being in particular designed as a Hirth-type face gear tooth coupling or similar flat-notch toothed coupling, for example one of the Gleason type.

The limit switches 59 are here arranged in a bore 91 at the bottom of the column 4 and are operated by tripping pins 92, 93 through the agency of a bore 94 associated with a one-way coupling 56, 57, 58 (see FIG. 7). With this embodiment, too, a drag ring 48 is provided which co-operates with a lifter 42 and a latch 22 pivotally assembled on the male threaded ring 7. The design of the male threaded ring 7 and the nut 9 corresponds with the other embodiments.

As discussed earlier, the invention substantially improves the reliability of indexing. It is thus possible to impose a substantially heavier load upon the turret, i.e., to operate at higher indexing speeds and/or to make it carry larger masses, without jeopardising the reliability of indexing.

Instead of an electric motor, in accordance with the invention other motors can be used as drive units. In particular, the electric motor can be replaced by a hydraulic motor. The design of the turret in accordance with the invention does not alter as a consequence of this. The hydraulic motor, however, can inherently be designed to operate at lower speeds and with higher torques so that when using a hydraulic motor, the reduction ratio can be lower.

Because the invention permits higher indexing speeds and larger masses, it is also frequently possible to provide between the rotatable section of the turret and the drive motor, a reduction gear of relatively low ratio and this in turn simplifies the installation of the drive motor and the reduction gear, in the stationary section of the turret.

The stop 31 between the faces 27 and 29 need not be provided or need not be used, because in the direction *a* the interlocking coupling 10 is tightened up by the axial motion so that in this direction the latch 20 need not rest against the stop 31 at all.

The magnitude of the overrun, indicated for example as 8° − 10°, simply has to be less than the largest pitch angle. In practice, the smallest pitch angle between the individual stations of a turret is 30° so that there is adequate room for the dimensioning of the overrun.

It is advisable to laterally support the latch 22 in the male threaded section 7, in a manner which has not been illustrated, so that when the latch 22 engages in the recess 32, the pin 23 carries practically no load at all.

Other embodiments and modifications are possible without departing from the spirit and scope of the invention as defined by the appended claims.

I claim:

1. A turret adapted to be remote-controlled and attached as a machining unit to a machine tool such as a lathe, and turret comprising, in combination, a stationary part for detachably mounting on a machine tool, a movable part, a reversible drive motor mounted on said stationary part, means mounting said movable part on said stationary part for both rotatable and axial movement, said rotatable mounting means including a one-way coupling engageable in one direction of rotation of said movable part with respect to said stationary part to unlock and pivot said movable part and disengageable in the other direction of rotation to lock said movable part with respect to said stationary part, a second interlocking coupling defined on said parts disposed co-axially with respect to the axis of rotation of said movable part and operable upon relative axial movement of said parts to lock said parts against relative rotation, a screw-threaded nut portion rotatably mounted on said stationary part mating with a thread defined on said movable part, said nut portion and said movable part being axially and rotatably displaceable with respect to each other wherein rotation of said movable part in said one direction in which said one-way coupling is engaged displaces said movable part in one axial direction in order to lock said interlocking coupling and upon said movable part rotating in the direction in which said one-way coupling is disengaged said movable part is moved in the opposite axial direction to unlock said interlocking coupling, said drive motor selectively rotating said movable part through a number of stations, control means sensing the position of said movable part controlling said motor, latch means selectively interconnecting said nut portion and said movable part together during rotation of said movable part in said other direction, latch control means operating said latch means, said drive motor rotating said movable part in said other direction of rotation past a selected station by a predetermined angle whereby said latch control means operates said latch means such that said latch means is disengaged before said drive motor is reversed to rotate said movable part in said one direction in order to lock said interlocking coupling.

2. A turret as claimed in claim 1, a latching recess defined in said movable part selectively receiving said latch means.

3. A turret as claimed in claim 1, in which said control means are provided on said stationary part of the turret for controlling said latch through the medium of a plurality of one-way couplings the number of which corresponds with the number of indexing positions of said movable part.

4. A turret as claimed in claim 3, in which said latch control means includes a lifter controlled by said one-way couplings, and a ring assembled concentrically with the axis of rotation of said movable part having lifter actuating means defined thereon.

5. A turret as claimed in claim 4, in which said ring, is fixed to said stationary part of the turret.

6. A turret as claimed in claim 5, in which said lifter actuating means include spring loaded ratchets which are rotatably mounted in a plurality of recesses defined in said ring whose number corresponds with the number of indexing positions of the turret and in which the lifter takes the form of a push rod co-operating with said ratchets.

7. A turret as claimed in claim 5, in which a spring loaded ratchet is rotatably mounted in said ring and in which said ring is provided with a plurality of ratchet recesses with which said ratchet co-operates and whose number corresponds with the number of indexing positions of the turret.

8. A turret as claimed in claim 2 in which said latch means, during its locking or unlocking motion, slides about the axis of the turret upon a segmental surface defined on said movable part which merges into said latching recess and is defined at its ends by stops.

9. A turret as claimed in claim 8, in which said stops are formed by a stop segment surface of a vertical position which, in the axial direction, is higher than said segmental surface.

10. A turret as claimed in claim 1, in which said drive motor is installed in a hollow column of said stationary part of the turret.

11. A turret as claimed in claim 10, in which said drive motor is installed eccentrically in the stationary part of the turret, said motor having an output shaft driving a reduction gear defined upon said nut portion rotatably mounted on said stationary part.

12. A turret as claimed in claim 10, in which said nut portion rotatably mounted on said stationary part of the turret is mounted on said hollow column.

13. A turret as claimed in claim 10, in which said drive motor is installed with its axis coincident to the axis of rotation of said movable part of the turret and drives a parallel reduction gear within said nut portion rotatably mounted on said stationary part of the turret.

14. A turret as claimed in claim 1, in which said stationary part of the turret passes through said movable part of the turret in the form of a column, said drive motor being mounted on the end of said stationary part.

* * * * *